(12) United States Patent
Neitzel

(10) Patent No.: US 6,283,667 B1
(45) Date of Patent: Sep. 4, 2001

(54) OIL FILLED PIN JOINT WITH PRESSURE RELIEVING BUFFER MEMBER

(75) Inventor: Daniel R. Neitzel, Elgin, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/337,684

(22) Filed: Jun. 22, 1999

(51) Int. Cl.[7] .................................................. F16C 11/02
(52) U.S. Cl. ........................... 403/158; 403/162; 277/589
(58) Field of Search .............................. 403/157, 31, 151, 403/158, 162; 277/396, 399, 402, 407, 589, 926

(56) References Cited

U.S. PATENT DOCUMENTS

| | | | |
|---|---|---|---|
| H1180 | * | 5/1993 | Arianoutsos et al. ................ 277/402 |
| 2,388,925 | | 11/1945 | Messinger . |
| 2,772,900 | * | 12/1956 | Campbell ............................. 277/589 |
| 2,999,707 | * | 9/1961 | Kniepkamp et al. ............ 403/225 X |
| 3,149,848 | * | 9/1964 | Galloway ............................. 277/589 |
| 3,167,321 | * | 1/1965 | Land et al. ...................... 277/390 X |
| 3,469,853 | * | 9/1969 | Gullick ................................. 277/589 |
| 3,645,543 | * | 2/1972 | Ksieski ................................. 277/589 |
| 3,788,651 | | 1/1974 | Brown et al. .......................... 277/34 |
| 3,860,250 | * | 1/1975 | Lundquist ............................. 277/589 |
| 3,860,271 | | 1/1975 | Rodgers ................................. 285/97 |
| 4,179,131 | * | 12/1979 | Nussbaumer ......................... 277/589 |
| 4,244,588 | * | 1/1981 | Langewisch ......................... 277/589 |
| 4,251,182 | * | 2/1981 | Schroeder ........................ 403/158 X |
| 4,300,775 | | 11/1981 | Ringel ................................. 277/34.3 |
| 4,398,862 | * | 8/1983 | Schroeder ........................ 403/162 X |
| 4,400,898 | * | 8/1983 | Christensen et al. ................. 403/158 |
| 4,577,874 | * | 3/1986 | Zitting .................................. 277/589 |
| 4,652,167 | * | 3/1987 | Garman .............................. 403/158 |
| 4,772,150 | * | 9/1988 | Horton ........................... 403/163 X |
| 4,890,937 | * | 1/1990 | Balsells .............................. 277/589 |
| 4,961,667 | | 10/1990 | Reinsma et al. ........................ 403/11 |
| 5,044,812 | | 9/1991 | Ardelt et al. .......................... 403/154 |
| 5,092,609 | * | 3/1992 | Balzano et al. ....................... 277/589 |
| 5,156,410 | * | 10/1992 | Hom et al. ........................... 277/589 |
| 5,265,890 | * | 11/1993 | Balsells .............................. 277/163 |
| 5,630,673 | * | 5/1997 | Krzywanos et al. ................. 403/158 |
| 5,725,221 | | 3/1998 | Pekarsky et al. ....................... 277/29 |
| 5,769,557 | | 6/1998 | Beals et al. .......................... 403/162 |

* cited by examiner

Primary Examiner—Lynne H. Browne
Assistant Examiner—David E. Bochna
(74) Attorney, Agent, or Firm—Haverstock, Garrett & Roberts; Liza J. Meyers

(57) ABSTRACT

The present oil filled pin joint includes at least one buffer member for absorbing rapid pressure increases or spikes in the oil contained in the joint. The present pin joint includes a pin, at least two opposed members joined by the pin for movement one relative to the other, the members defining a space therebetween, and at least one seal disposed between the opposed members sealably enclosing the space. The at least one buffer member is disposed in communication with the space, the space having a volume defined by the opposed members, the at least one seal, and the at least one buffer member. The space is at least substantially filled with oil and the opposed members are relatively movable to effectively trap at least some of the oil in the space and pressurize the trapped oil, the at least one buffer member being resiliently compressible by the pressurized trapped oil to reduce the pressurization to avoid damaging the at least one seal.

5 Claims, 5 Drawing Sheets

OIL FILLED PIN JOINT WITH PRESSURE RELIEVING BUFFER MEMBER

TECHNICAL FIELD

This invention relates generally to pin joints for use in pivotally connecting the linkage components for supporting and articulating a work implement or tool of a loader vehicle or the like, and more particularly, to an oil filled pin joint including at least one resiliently compressible buffer member disposed for relieving rapid pressure increases or spikes in the oil resultant from abrupt loading, unloading and/or contact with hard objects and the like.

BACKGROUND ART

Pivoting pin joints for loader linkages and the like are normally lubricated with either grease or oil. Oil lubricated joints are typically preferred because they afford greater load carrying capacity and component life than grease lubricated joints, and they eliminate the routine maintenance needed to grease the joints on a daily or per shift basis. For this reason, oil lubricated joints are commonly referred to as low maintenance or maintenance free joints. However, such maintenance free joints must have an effective sealing system to prevent the loss of lubricating oil from the joint that would otherwise result in joint failure. Reference for instance, Reinsma et al. U.S. Pat. No. 4,961,667 issued Oct. 9, 1990 to Caterpillar Inc., which discloses a pivot joint for loader linkages and the like. This joint utilizes shear loaded face seals located in annular grooves of one of the members joined by the joint, the face seals including a sealing ring having a generally L-shaped cross-section, and an annular load ring. The load ring applies a force against the sealing ring which urges it into dynamic sealing engagement against another member connected by the joint. However, sometimes the members joined together by the joint are moved one relative to the other, such as when a heavy load is lifted or dumped, or a hard object is contacted, so as to exert a high pressure or spike against the face seal, causing the seal to be urged harder against the other member resulting in increased frictional wear and possible leakage so as to shorten the service life of the seal.

Accordingly, the present invention is directed to overcoming one or more of the problems as set forth above.

DISCLOSURE OF THE INVENTION

According to one aspect of the present invention, an oil filled pin joint including at least one buffer member for absorbing rapid pressure increases or spikes in the oil is disclosed. The present pin joint includes a pin, at least two opposed members joined by the pin for movement one relative to the other, the members defining a space therebetween, and at least one seal disposed between the opposed members sealably enclosing the space. The at least one buffer member is disposed in communication with the space, the space having a volume defined by the opposed members, the at least one seal, and the at least one buffer member. The space is at least substantially filled with oil and the opposed members are relatively movable to effectively trap at least some of the oil in the space and exert a pressurizing force against the trapped oil, the at least one buffer member being resiliently compressible by the trapped oil to reduce the pressurizing force to prevent damage to the at least one seal and to prevent oil leakage.

BEST MODE FOR CARRYING OUT THE INVENTION

Figure 1:
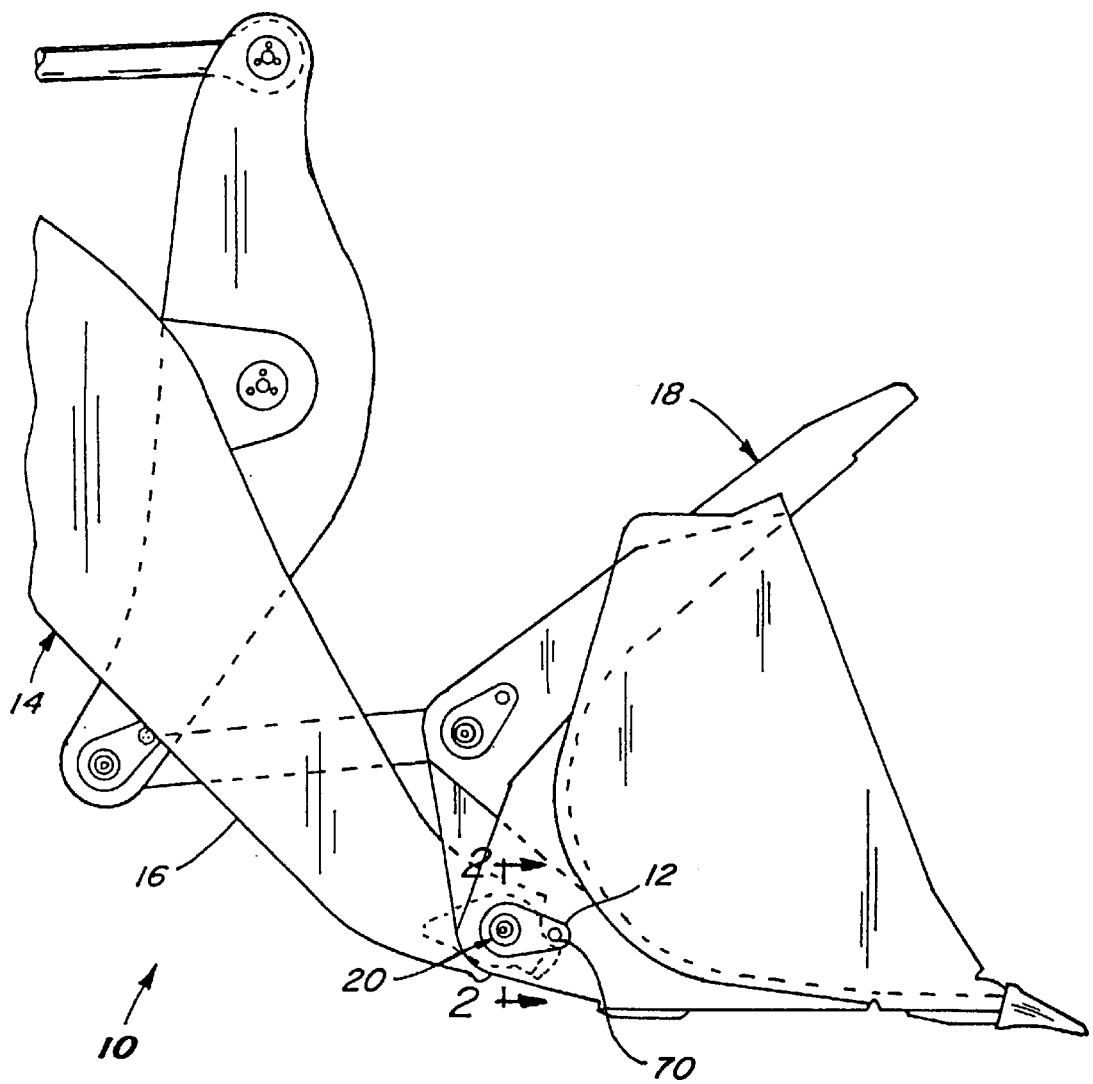
FIG. 1 is a fragmentary side view of a front end loader vehicle equipped with an oil filled pin joint including pressure buffer members according to the present invention.

The front end of a work machine, such as a wheel loader 10, is shown in FIG. 1. It should be known and understood that although a wheel loader 10 is illustrated and described herein that any work machine, such as, but not limited to, another material handling machine, may be utilized for the invention hereinafter described. Wheel loader 10 has a structural frame 14 including a pivotally mounted lift arm 16. Lift arm 16 pivotally supports a bucket 18 articulatable for scooping and lifting soil, minerals and other materials, as is well known in the art. Bucket 18 is pivotally connected to lift arm 16 with an oil sealed pin joint 20 constructed and operable according to the teachings of the present invention, located behind a pin retainer plate 12.

Figure 2:
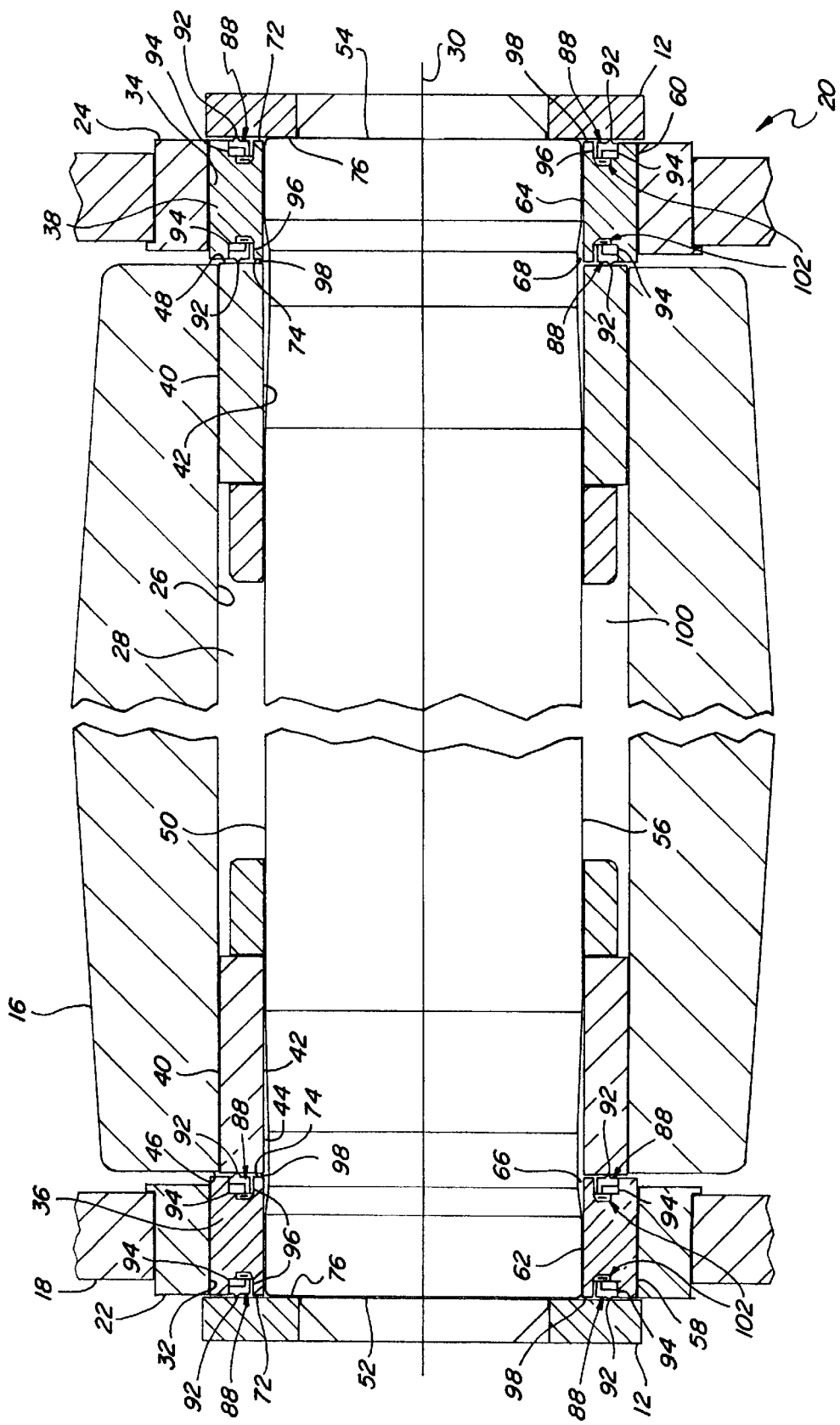
FIG. 2 is a cross-sectional view taken along line 2—2 of FIG. 1 illustrating the construction of the pin joint of the present invention.

Referring also to FIG. 2, lift arm 16 is disposed between two brackets 22 and 24 of bucket 18. Lift arm 16 includes an annular bearing seat 26 defining a passage 28 having an axis 30 extending therethrough, and brackets 22 and 24 include annular inner side walls 32 and 34, respectively, defining apertures 36 and 38 therethrough, apertures 36 and 38 being axially aligned with passage 28. A pair of annular sleeve bearings 40 are press fit against bearing seat 26 so as to be retained in passage 28 of arm 16 adjacent the respective ends of passage 28. Bearings 40 each include an inner circumferential surface 42 defining an axially extending bore 44, and first and second outwardly facing axial end faces 46 and 48 on opposite ends of bore 44.

Pin joint 20 includes an elongate pin 50 supported in bore 44 for relative rotation with bearing 40 about axis 30. Pin 50 includes a first axial end 52 and an opposite second axial end 54, axial ends 52 and 54 extending axially outwardly from bearing 40 beyond end faces 46 and 48, respectively. Pin 50 further includes an outer circumferential surface 56. A first collar bearing 58 is press fit against side wall 32 of bracket 22 so as to be retained in aperture 36, and a second collar bearing 60 is press fit against side wall 34 of bracket 24, so as to be retained in aperture 38 thereof. Collar bearings 58 and 60 includes inner circumferential surfaces 62 and 64, respectively, which define bores 66 and 68 which cooperatively receive respective axially ends 52 and 54 of pin 50 for relative rotation therewith. Pin 50 is retained in axial position in bores 44, 66 and 68 by retainer plates 12 which are attached to respective brackets 22 and 24 by bolts 70 (FIG. 1). Collar bearings 58 and 60 each include an axial end face 72 located in opposed relation to an inner surface 76 of a respective retainer plate 12, and an opposite axial end face 74 located in opposed relation to a respective axial end face 46 and 48 of bearing 40.

Figure 3:
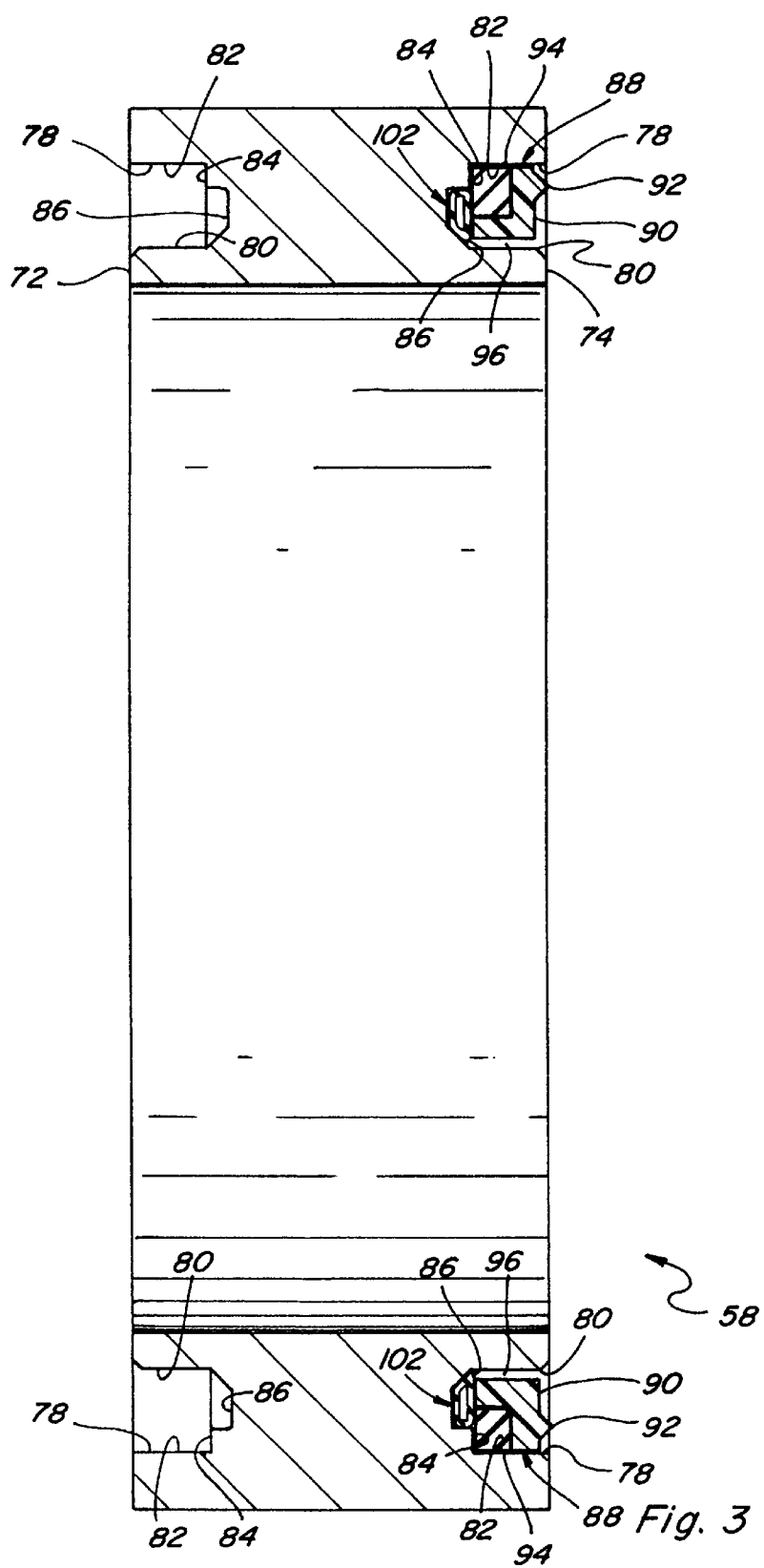
FIG. 3 is a cross-sectional view of a collar bearing of the present pin joint showing the location of buffer members therein.

Referring also to FIG. 3, which representatively shows collar bearing 58, each axial end face 72 and 74 of the collar bearings 58 and 60 includes an annular groove 78 therein of generally rectangular cross-section defined by opposed inboard and outboard side walls 80 and 82, and a bottom wall 84 extending therebetween. Bottom wall 84 additionally includes an axially recessed annular cavity 86 extending therearound. An annular face seal 88 is located in each cavity 86 and is preferably of two piece construction including an annular sealing ring 90 of a more rigid polymeric material or metal including an annular sealing lip portion 92 positioned so as to extend axially outwardly from groove 78, and an annular load ring 94 of a softer, resiliently compressible material such as an elastomer or rubber. When load ring 94 is axially compressed, it supplies a force against sealing ring 90 which urges lip portion 92 thereof into dynamic sealing engagement against the respective opposing end face 46 or 48 or surface 76. The face seals 88 are of lesser radial extent compared to grooves 78, and have a diametric dimension which provides an annular space 96 between seal 88 and inboard side wall 80, which space 96 lies in communication with cavity 86.

Referring primarily again to FIG. 2, pin 50 has an overall axial extent as measured between the axial ends of end portions 52 and 54 which is marginally greater than the combined axial extents of bearings 40, 58 and 60, such that a generally predetermined range of axial end play is normally allowed between lift arm 16 and brackets 22 and 24. This end play allows the respective widths of annular spaces 98 to vary as measured between the axial end faces 72 of collar bearings 58 and 60 and respective surfaces 76 of retainer plates 12, and between axial end faces 74 of collar bearings 58 and 60 and axial end faces 46 and 48 of bearings 40, respectively. Additionally, the inner circumferential surfaces 42, 62 and 64 of respective bearings 40, 58 and 60 are marginally larger in diametrical extent than the opposing portions of outer circumferential surface 56 of pin 50, thereby defining an annular main journal cavity 100 around pin 50 in communication with spaces 98 and through spaces 98 with spaces 96. Journal cavity 100 is filled with a quantity of a suitable lubricating oil to immerse pin 50 and to substantially fill spaces 96 and cavities 98 so as to provide lubrication at the interfaces between pin 50 and bearings 40, 58 and 60, to allow free movement of joint 20. The oil is contained within spaces 96 by face seals 88.

During the operation of wheel loader 10, as bucket 18 and lift arm 16 are moved or articulated one relative to the other for loading, lifting, dumping and the like, lift arm 16 and brackets 22 and 24 are allowed by the end play in joint 20 to shift or move axially one relative to the other such that spaces 98 will vary in size and thus volume, some of the spaces 98 increasing in volume while other spaces 98 are decreasing in volume. From time to time, this shifting or moving can be abrupt, for instance when bucket 18 strikes a hard member such as a rock or the like, such that the oil in a space 98 can become effectively trapped temporarily as the space decreases in volume, due to the relatively small size of journal cavity 100 and resultant limited oil flow capability therethrough relative to the possible rate of the decrease in volume of the space 98, such that a rapidly increasing pressure or spike can be exerted against the trapped oil. If not relieved, the pressurized oil 100 can exert a corresponding force against the adjacent face seal 88, permitting pressurized oil 100 to leak past the face seal 88. To stop leakage, the contact pressure on the face seal 88 must be increased, which results in increased frictional contact between lip portion 92 and the opposing surface, which can, over time, result in increased frictional wear of lip portion 92 and leakage thereby so as to shorten the effective service life of the seal.

Figure 4:
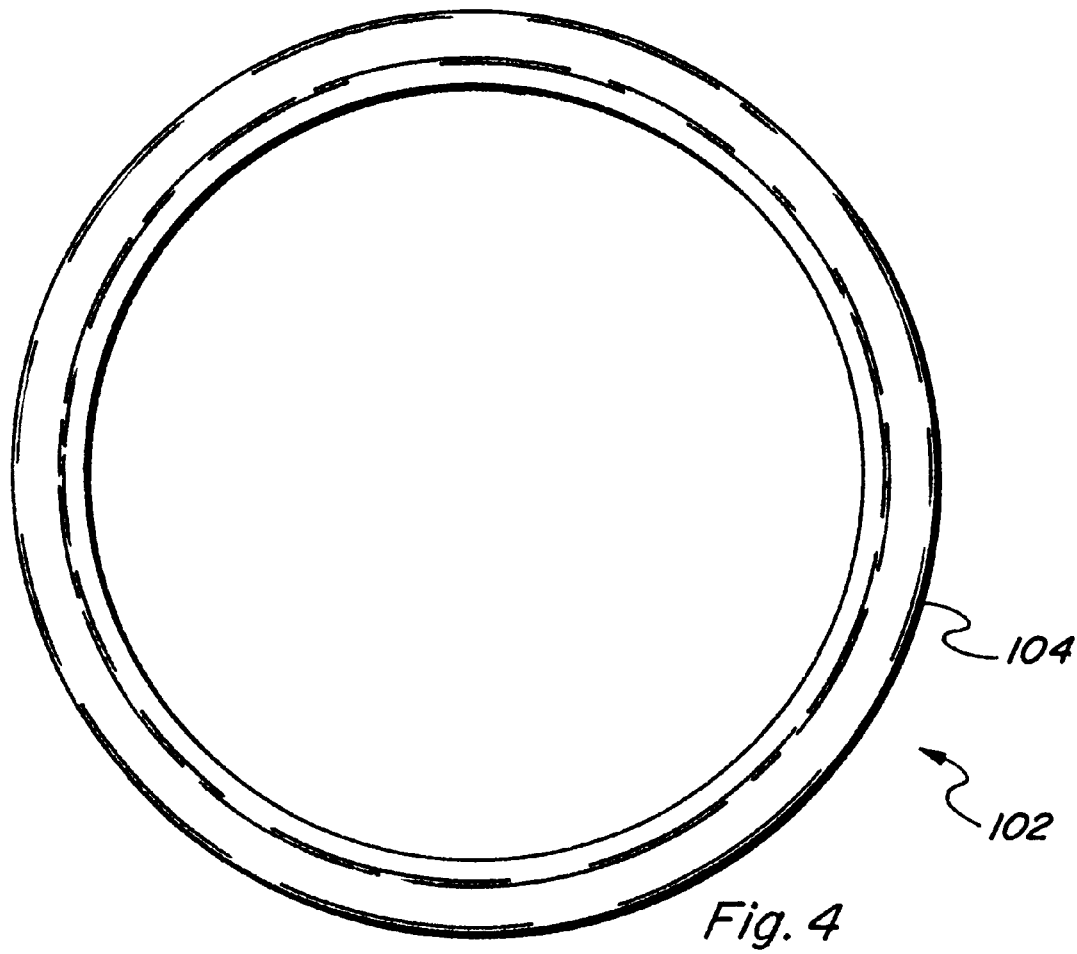
FIG. 4 is an end view of one of the buffer members of FIG. 3.
Figures 5, 6:
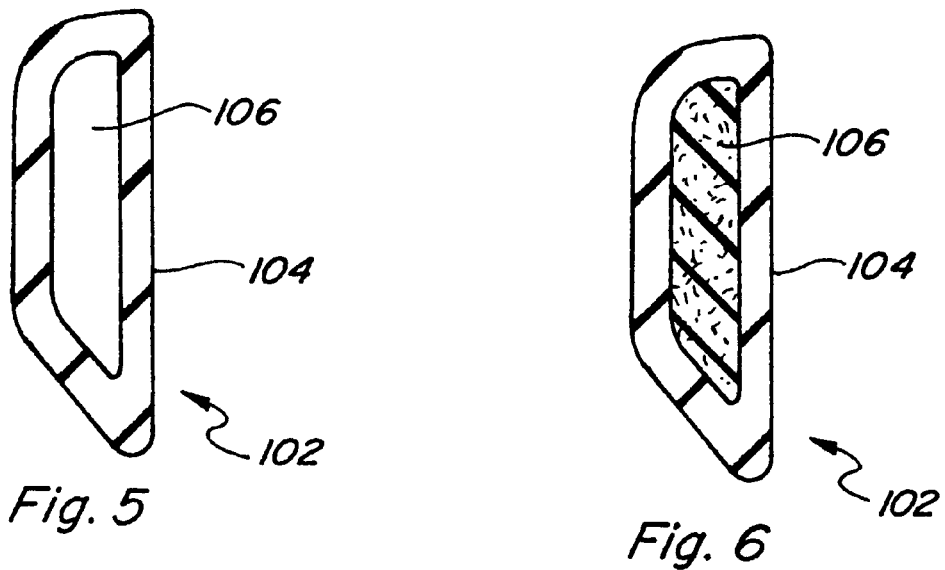
FIG. 5 is a cross-sectional view taken along line 5—5 of FIG. 4 illustrating the construction of the buffer member.
FIG. 6 is a cross-sectional view of another embodiment of a buffer member according to the present invention.

To avoid such results, the present pin joint 20 includes annular or ring shaped buffer members 102 disposed in the annular cavities 86. Referring to FIGS. 3, 4 and 5, each buffer member 102 is formed of a resilient material such as a soft elastomer or rubber, and includes a body portion 104 of tubular cross-section defining an annular cavity 106 containing an entrapped gas such as air at about atmospheric pressure to provide a compressibility capability. Referring also to FIG. 6, cavity 106 can alternatively be filled with a compressible material such as a foamed elastomer to provide a desired compressibility.

As illustrated in FIGS. 2 and 3, the buffer members 102 are positioned in cavities 78 in passive relation to face seals 88, that is, buffer members 102 can contact but do not otherwise affect the operation of face seals 88.

Figure 7:
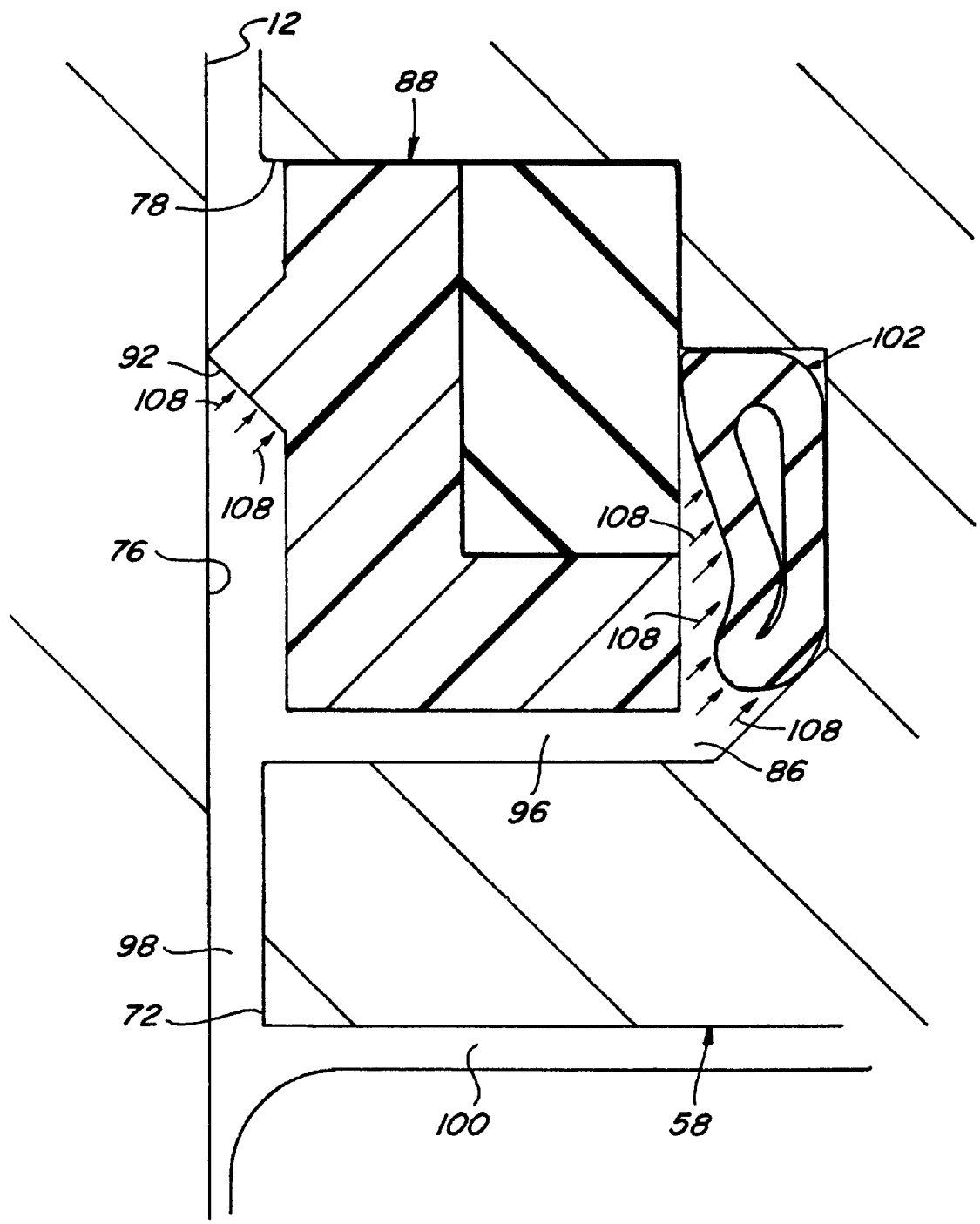
FIG. 7 is an enlarged fragmentary cross-sectional view of the present joint illustrating a buffer member thereof in a compressed state.

Turning to FIG. 7, a buffer member 102 is shown in place in cavity 86 of groove 78 of collar bearing 58. The view is enlarged to better show the effect of space 98 between end face 72 of collar bearing 58 and opposed surface 76 of plate 12 being rapidly decreased in width to correspondingly rapidly decrease the collective volume of spaces 98 and 96. As explained above, the volume decrease operates to effectively trap the oil contained in spaces 96 and 98 temporarily, due to the inability of the oil to escape quickly enough through journal cavity 100, such that the trapped oil is pressurized. If allowed to pressurize too much, the problems discussed above relating to failure of face seal 88 can occur. To avoid this problem, buffer member 102 is resiliently yieldable to, or compressible by, the pressurized oil, as represented by arrows 108, to provide a volume increase which offsets, at least partially, the decrease in volume of space 98, and effectively reduces or relieves or buffers the pressurization of the oil. Then, when enough of the trapped oil escapes through journal cavity 100, or space 98 expands sufficiently, to relieve the pressurization, buffer member 102 will decompress or expand accordingly, up to as much as its original volume.

To achieve this capability, buffer member 102 is more resiliently yieldable to the pressurized oil than lip 92 of face seal 88, and is compressible by the anticipated pressures to a volume at least roughly corresponding to the anticipated decrease in volume of space 98. Also, although buffer member 102 is depicted here as an annular member located in cavity 86, the buffer member could have a wide variety of alternative shapes and locations in communication with space 98 to provide pressure relief in essentially the same manner described above.

INDUSTRIAL APPLICABILITY

The oil filled pin joint with pressure relieving buffer member of the present invention has utility for a wide variety of applications wherein a durable, pressure spike resistant, low maintenance pin joint is required.

Other aspects, objects and advantages of the present invention can be obtained from a study of the drawings, the disclosure and the appended claims.

What is claimed is:

1. An oil filled pin joint, comprising:
   a pin;
   at least two opposed members joined by the pin for movement one relative to the other, the members defining a space therebetween;
   at least one seal disposed between the opposed members sealably enclosing the space;
   at least one tubular buffer member comprising an annular member of resilient elastomeric material having a tubular cross-section and disposed in communication with the space, the space having a volume defined by the opposed members, the at least one seal and the at least one tubular buffer member, the space being at least substantially filled with oil; and the opposed members being relatively movable to effectively trap at least some of the oil in the space and pressurize the trapped oil, the at least one tubular buffer member being resiliently compressible by the trapped oil to reduce the pressurization of the oil.

2. The oil filled pin joint of claim 1, wherein the at least one seal comprises a sealing ring disposed in an annular groove in one of the opposed members and positioned for forming a sealed condition with another of the opposed members, and the at least one buffer member comprises a resiliently compressible member disposed in an annular cavity communicating with the groove.

3. The oil filled pin joint of claim 1, wherein the tubular cross-section of the buffer member defines a cavity filled with a gas.

4. The oil filled pin joint of claim 1, wherein the tubular cross-section of the buffer member defines a cavity containing a resiliently compressible foamed material.

5. The oil filled pin joint of claim 1, wherein the at least one seal includes a sealing ring disposed in an annular groove in one of the opposed members and a resilient load ring disposed in the groove biasing the sealing ring into sealed contact with another of the opposed members, and the at least one buffer member includes a resiliently compressible ring disposed in an annular cavity communicating with the groove adjacent the sealing ring.

* * * * *